United States Patent
Butler et al.

(10) Patent No.: US 12,499,334 B2
(45) Date of Patent: Dec. 16, 2025

(54) SYSTEM FOR ENABLING AND DISABLING EQUIPMENT USING DUAL RFID CHIPS

(71) Applicant: T-Mobile Innovations LLC, Overland Park, KS (US)

(72) Inventors: Robert Keith Butler, Overland Park, KS (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 118 days.

(21) Appl. No.: 18/503,926

(22) Filed: Nov. 7, 2023

(65) Prior Publication Data
US 2025/0148226 A1   May 8, 2025

(51) Int. Cl.
G06K 7/10    (2006.01)
(52) U.S. Cl.
CPC ............... G06K 7/10099 (2013.01)
(58) Field of Classification Search
CPC .................................. G06K 7/10099
See application file for complete search history.

(56) References Cited

U.S. PATENT DOCUMENTS

2007/0290791 A1 * 12/2007 Batra ................. G08B 13/1409
340/5.31

* cited by examiner

Primary Examiner — Matthew Mikels

(57) ABSTRACT

An apparatus configured to control operation of a product. The apparatus includes an integrated RFID tag embedded in the product and configured to communicate with an external user device. The integrated RFID tag stores a first working key associated with the product and is further configured to receive a second working key transmitted from the external user device. The apparatus includes control logic operatively coupled to the integrated RFID tag and configured to read the first working key and the second working key from the integrated RFID tag. The control logic determines whether the first and second working keys match and, in response to a determination that the first and second working keys match, the control logic enables a controlled functionality of the product.

20 Claims, 9 Drawing Sheets

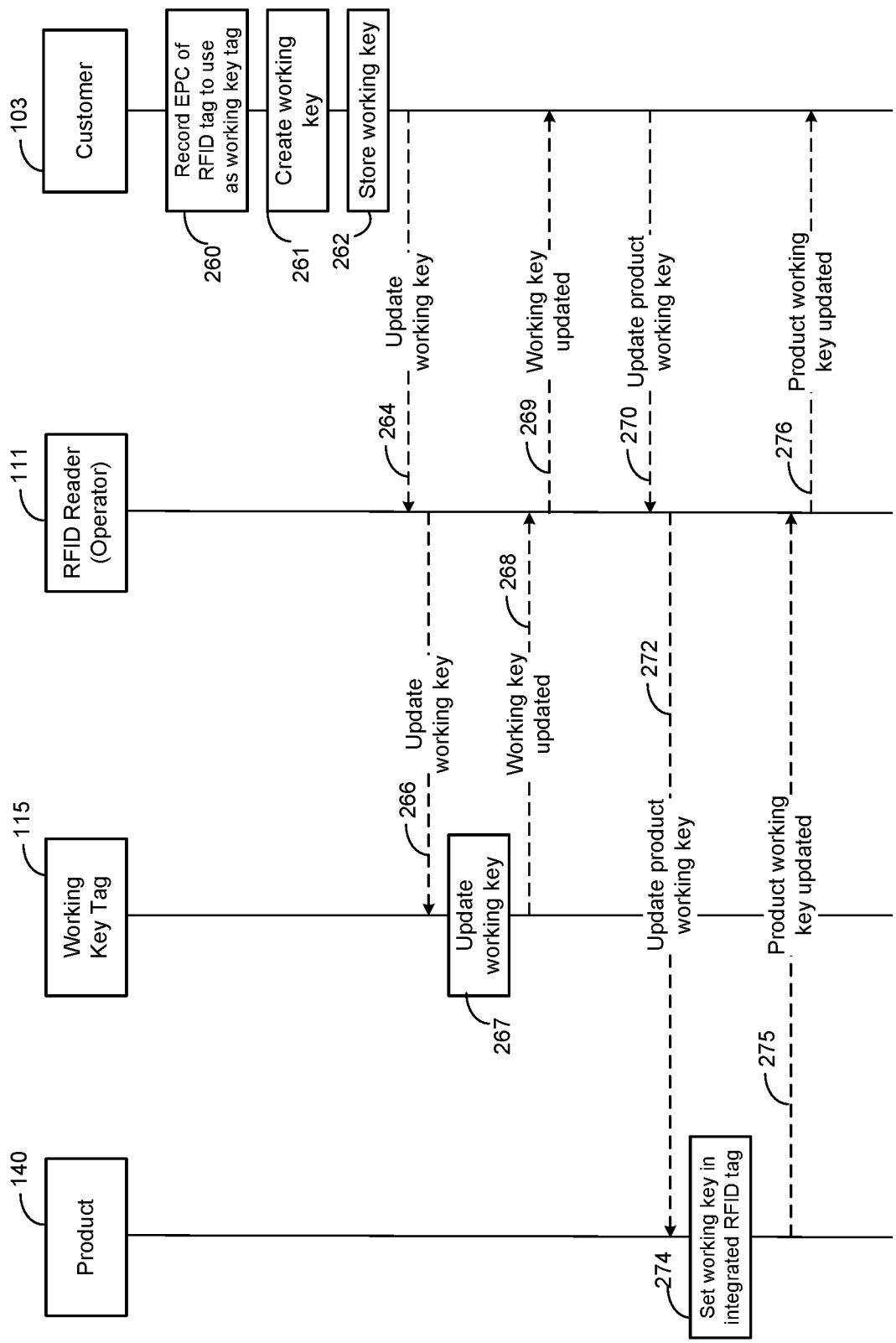

US 12,499,334 B2

SYSTEM FOR ENABLING AND DISABLING EQUIPMENT USING DUAL RFID CHIPS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Powered portable devices, such as exercise equipment, power tools (e.g., drills, sanders, saws), and consumer electronics (e.g., computers, mobile phones, tablets, monitors) are subject to being lost or stolen. Found items may be returned to their owners, but these items also may be kept and used by others. These devices are attractive to thieves who rely on being able to use or to sell the devices.

To reduce shrinkage, some retailers may use an embedded RFID tag in a powered portable device that disables the device until it is purchased. When a customer purchases the device, the RFID tag is scanned and provisioned to enable the device to operate. This protects the retailer from theft since the device will not work without being activated. As a result, thieves are less motivated to steal the equipment. However, a customer is not protected after the purchase. If a device is lost or stolen from a customer, the stolen device behaves identically to a device that does not have the RFID tag.

SUMMARY

In an embodiment, an apparatus configured to control operation of a product is disclosed. The apparatus comprises an integrated RFID tag embedded in the product and configured to communicate with an external user device, wherein the integrated RFID tag stores a first working key associated with the product and is further configured to receive a second working key transmitted from the external user device. The apparatus further includes control logic operatively coupled to the integrated RFID tag and configured to read the first working key and the second working key from the integrated RFID tag. The control logic determines whether the first and second working keys match and, in response to a determination that the first and second working keys match, the control logic enables a controlled functionality of the product.

In an embodiment, a user device configured to control the operation of a product is disclosed. The user device comprises an RFID reader configured to communicate with an integrated RFID tag embedded in the product and a working key RFID tag controlled by a user of the user device. The user device further includes a processor operatively coupled to the RFID reader and configured to read a first working key stored in the working key RFID tag and to read a second working key stored in the integrated RFID tag. The processor is further configured to: i) determine whether the first and second working keys match; and ii) in response to a determination that the first and second working keys match, transmit an enable command to the product, wherein the enable command enables a controlled functionality of the product to operate.

In an embodiment, a product is disclosed. The product comprises: i) a controlled functionality configured to be enabled by an enable command and to be disabled by a triggering event; and ii) an integrated RFID tag embedded in the product and configured to communicate with an external user device. The integrated RFID tag stores a first working key associated with the product and is further configured to receive a second working key transmitted from the external user device. The product further includes control logic operatively coupled to the integrated RFID tag and configured to read the first working key and the second working key from the integrated RFID tag and to determine whether the first and second working keys match, wherein the control logic, in response to a determination that the first and second working keys match, is further configured to transmit the enable command to the controlled functionality of the product.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2C is a flow diagram of a method of provisioning a working key tag according to an embodiment of the disclosure.

DETAILED DESCRIPTION

Figure 1A:
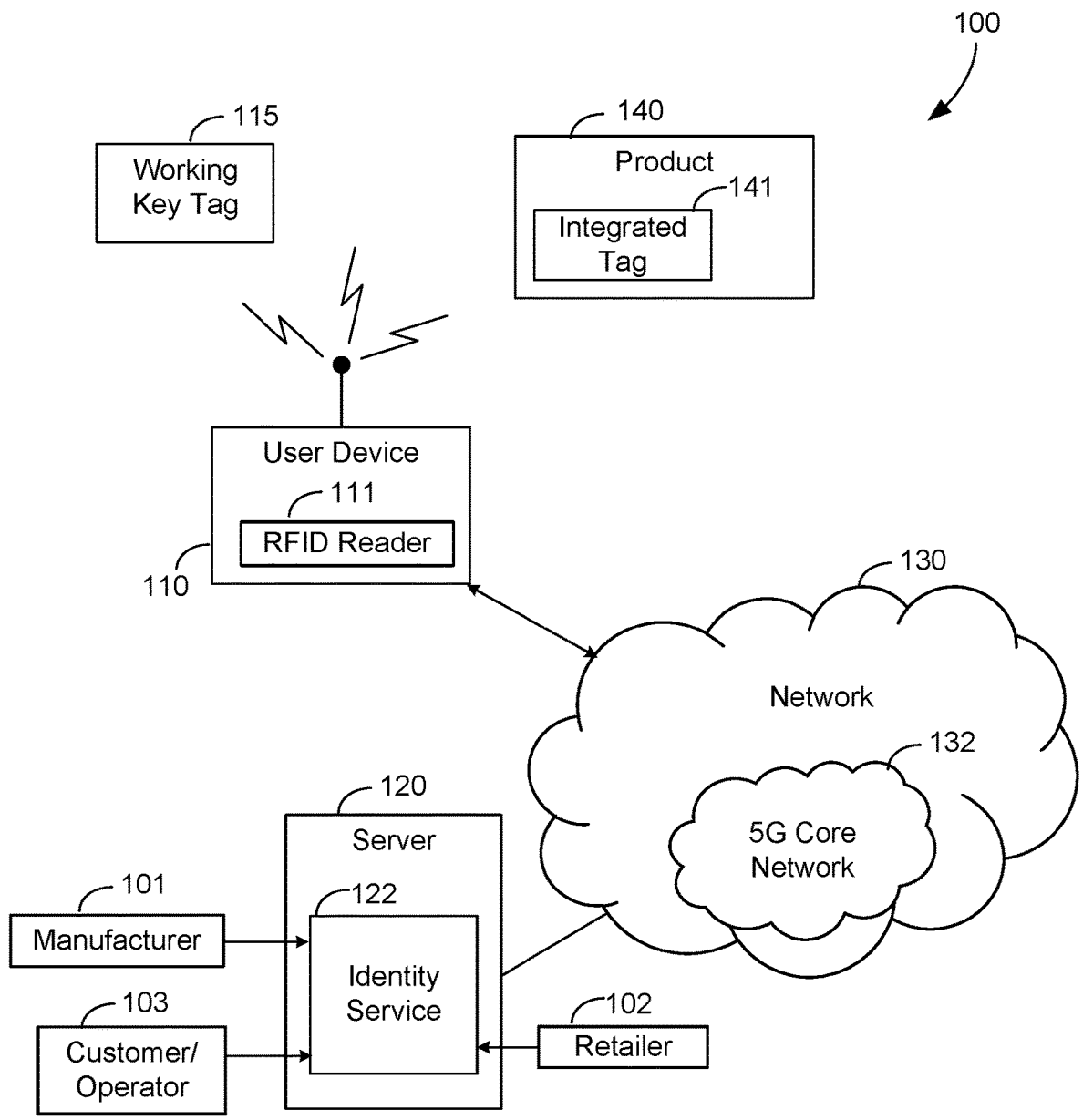
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless identification (ID) tags respond to a radio frequency (RF) signal from a reader device by emitting an RF response signal. Some wireless identification tags have a battery or other power storage component, while other such tags harvest power from an ambient electromagnetic field. A wireless identification tag may emit an RF response signal in response to a signal comprising predetermined data. A wireless identification tag may also emit an RF response signal in response to detecting RF radiation in a predetermined RF frequency band. Some such wireless identification tags are referred to as RFID tags.

The apparatus and method disclosed herein enable and disable a product (e.g., power saw, power drill, sander, or other user equipment) using a user device (e.g., a smart phone) that communicates with a first RFID tag embedded in the product and a second RFID tag in the possession or control of the owner or operator of the product. When the user device controlled by the owner/customer detects that the first and second RFID tags are in proximity to the user device and to each other, the user device transmits an enable signal to the embedded (or integrated) RFID tag in the product. which in turn enables operation of the product.

The user device includes an RFID reader that communicates with the embedded RFID tag in the product and the second RFID tag in the possession of the owner or operator of the product. The disclosed apparatus and method protect the product owner from loss, theft, and unauthorized operation. A person who finds a lost product will be more likely to return it since it is valuable, but inoperable. A thief will avoid stealing the product since it will be inoperable. The product cannot be borrowed or used without also holding the second RFID tag.

The disclosed apparatus is implemented using three devices and software, including: i) an integrated RFID tag with a settable state embedded in the product that is detectable by the user device; ii) a second, standard RFID tag that must be near the product and the user device; and iii) an RFID reader in the user device that is able to read both RFID tags.

In the disclosure that follows, certain terms or phrases shall have the following definitions or meanings. A "customer" refers to a human actor and/or to software the human actor is using or controlling. The customer may also be referred to as an "owner", an "operator", or a "user". A "product" refers to a piece of power equipment that may be purchased from a retailer and owned by a customer. The owner/customer may loan or give the product to an authorized person, who may also be referred to as an operator or a user. A "barcode" refers to a visibly readable code containing a serial number that appears on the physical housing or other portion of the product. A "serial number" refers to a globally unique product identification. An "electronic product code" (EPC) refers to a unique code (data) assigned to each RFID tag and that may be read by an RFID reader. An EPC is clear text, not encrypted text. An "owner ID" refers to a code designating or identifying the current owner of the product. A "master key" refers to a configurable, encrypted key (data) stored in the integrated RFID tag of the product. The master key must be known in order to change the working key or to change the master key itself. The master key is used for recovery if a working key is lost. The master key can distribute multiple working keys, but will likely restrict distribution of the master key. A "working key" refers to a configurable, encrypted key (data) stored in the integrated RFID tag of the product and in the working key tag. An "integrated tag" refers to an RFID tag that is imbedded in a product to control operation of the product using a master key and a working key. A "working key tag" refers to an RFID tag storing a working key that must be present for product operation. An "identity service" refers to a network service that supports transfer of ownership of a product, transfer of control of a product, and optionally data backup services.

Turning now to FIG. 1A, a block diagram of a communication system 100 is described according to an embodiment of the disclosure. System 100 comprises a user device 110, a working key RFID tag 115, a server 120, and a product 140. User device 110 includes an RFID reader 111 and product 140 includes an integrated RFID tag 141 that is embedded in product 140. User device 110, which may be a mobile phone, is configured to communicate with product 140 and working key RFID tag 115 using RFID reader 111. Thus, user device 110 is capable of receiving working key data, master key data, and EPC data from product 140 and/or working key RFID tag 115. User device 110 is further capable of transmitting an enable command and/or a disable command to product 140 in order to enable operation of the product 140 and to shut down (and disable) product 140.

The operations of RFID equipment, such as RFID reader 111, integrated RFID tag 141 and working key RFID tag 115, are well known. The term "RFID" refers to a wireless system comprised of two components: a tag and a reader. An RFID reader is a device that has one or more antennas that emit radio waves and receive signals back from the RFID tag. An RFID tag comprises an integrated circuit (IC), an antenna and a substrate. The part of an RFID tag that encodes identifying information is called the RFID inlay.

There are two main types of RFID tags: active RFID tags and passive RFID tags. An active RFID tag has its own power source, often a battery. The transmission (or operating) range of a system using an active RFID tag may be up to approximately 100 meters. A passive RFID tag receives its power from the reading antenna, whose electromagnetic wave induces a current in the RFID tag's antenna. The transmission (or operating) range of a system using a passive RFID tag may be up to approximately 10-12 meters. There are also semi-passive RFID tags, which implement a battery that runs the circuitry while communication is powered by the RFID reader 111.

In some embodiments, RFID reader 111 may be implemented as a software application stored in a non-transitory memory of user device 110 that uses radio frequency (RF) components that already exist in user device 110. By way of example, if user device 110 is a mobile phone, user device 110 may comprise a WIFI transceiver or a Bluetooth transceiver (or both) that can be reconfigured by the software application in the memory of user device 110 to function as RFID reader 111 and thereby communicate with integrated RFID tag 141 and working key RFID tag 115.

User device 110 is further configured to communicate with an identity service 122 hosted by server 120. In FIG. 1A, user device 110 communicates with identity service 122 through a network cloud 130, which includes a 5G core network 132. Server 120 and identity service 122 are shown as independent elements outside of network cloud 130. However, this is by way of example only. In other embodiments, server 120 and identity service 122 may be components that are integrated into network cloud 130.

5G core network 132 is based on a service-based architecture paradigm. Rather than constructing a core network as a series of special purpose communication nodes (e.g., an HSS node, an MME node, etc.) running on dedicated server computers, 5G core network 132 is provided as a set of services or network functions (e.g., identity service 122). These services or network functions can be executed on virtual servers in a cloud computing environment (e.g., network cloud 130) which supports dynamic scaling and avoids long-term capital expenditures (fees for use may substitute for capital expenditures). These network functions can include, for example, a user plane function (UPF), an authentication server function (AUSF), an access and mobility management function (AMF), a session management function (SMF), a network exposure function (NEF), a network repository function (NRF), and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 132 may be segregated into a user plane and a control plane, thereby promoting independent scalability, evolution, and flexible deployment.

Identity service 122 is a network service that supports transfer of ownership of product 140 between a manufacturer 101 and a retailer 102 and between a retailer 102 and a customer/operator 103. Identity service 122 also supports transfer of control of product 140 between a retailer 102 and a customer 103 and between a customer 103 and an authorized user, such as an employee. Optionally identity service 122 may provide data backup services. Identity service 122 is configured to communicate with communication devices (e.g., mobile phones, computers, retail barcode scanners, etc.) that are operated by a manufacturer 101, a retailer 102, or a customer 103 or operator 103 of product 140. As detailed below, identity service is therefore capable of gathering RFID tag information and EPC information from working key RFID tag 115 and product 140 and associate the information with a product 140 provided by manufacturer 101, sold by a particular retailer 102, and owned by a particular customer 103.

Figure 1B:
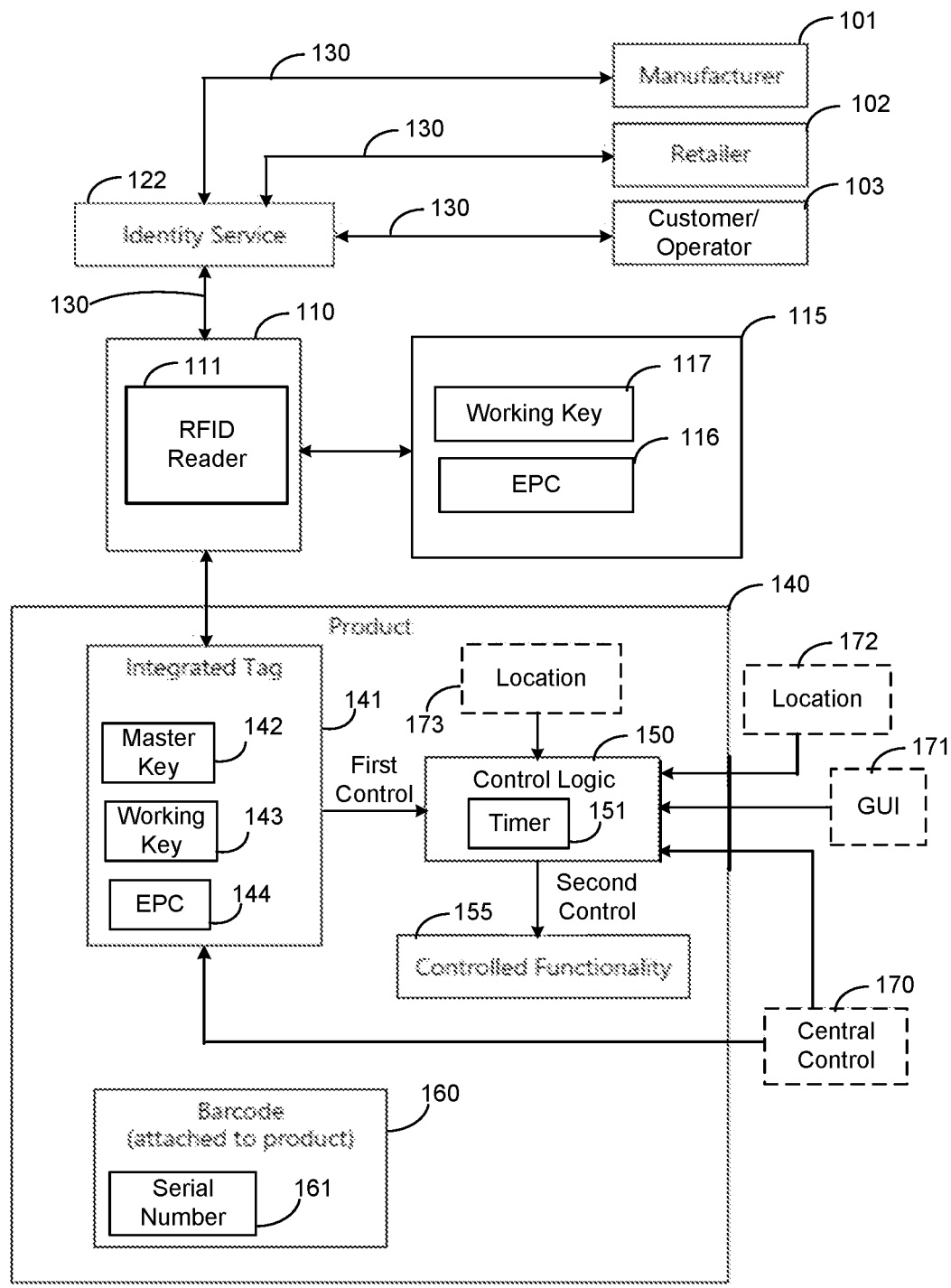
FIG. 1B is a block diagram of a communication system according to an embodiment of the disclosure.

FIG. 1B is a block diagram showing in greater detail selected elements of communication system 100 in FIG. 1A according to an embodiment of the disclosure. For simplicity, network cloud 130 is represented in FIG. 1B as communication paths between the user device 110 and identity service 122 and between identity service 122 and manufacturer 101, retailer 102 and customer 103.

Working key RFID tag 115 comprises an RFID tag that includes a working key 117 and an electronic product code (EPC) 116. Working key 117 is a configurable, encrypted key (i.e., a data value) stored in working key RFID tag 115. EPC 116 is a unique code (i.e., a data value) assigned to working key RFID tag 115 that may be read by an RFID reader. EPC 116 is clear text, not encrypted text like working key 117.

Product 140 includes integrated key tag 141, control logic 150, controlled functionality 155, and barcode 160. Integrated key tag 141 includes master key 142, working key 143, and EPC 144. Working key 143 is a configurable, encrypted key (i.e., data value) associated with integrated RFID tag 141. Master key 142 is a configurable, encrypted key (i.e., data value) associated with integrated RFID tag 141. Master key 142 must be known in order to change working key 143 or to change master key 142 itself. Master key 142 may be used for recovery if working key 143 is lost. Master key 142 may be configured to distribute multiple working keys 143. EPC 144 is a unique code (i.e., a data value) assigned to integrated key tag 141 that may be read by an RFID reader 111. EPC 116 is clear text, not encrypted text like working key 117. As will be explained below in greater detail, control logic 150 is configured to detect a triggering event and, in response, to disable the operation of controlled functionality 155. A triggering event may be, for example, the expiration of a timer, movement of product 140 outside of an allowed area, a selected time of day, or receipt of a control signal from integrated RFID tag 141.

Barcode 160 includes a serial number 161. Barcode 160 may comprise a visibly readable label (such as a sticker) that lists serial number 161 and that appears on the physical housing or other portion of the product 140. Serial number 161 is a globally unique product identification associated with product 140. By way of example, if product 140 is a multifunction electronic meter that integrates a voltmeter, ammeter, and ohmmeter in one product, barcode 160 may be a plastic sticker or a metal plate attached to the exterior of the housing of product 140. The serial number 161 may be a numeric or alphanumeric string of characters that uniquely identify product 140 and that are easily visible to the customer 103.

Control logic 150 may comprise a microprocessor or microcontroller and an associated memory that controls the overall operation of product 140. In an embodiment, the memory may comprise a non-transitory memory portion that stores instructions (e.g., software and/or firmware). The microprocessor or microcontroller may execute the instructions to perform the functions described herein. According to the principles of the present disclosure, control logic 150 is configured to receive a first control signal from integrated RFID tag 141 and/or from user device 110 that enables or disables the operation of product 140. In response to receipt of the first control signal, control logic 150 sends a second control signal to controlled functionality 155 that either enables or disables the operation of controlled functionality 155 and, as a result, enables or disables the operation of product 140. By way of example, controlled functionality 155 may comprise a power supply switch that may be opened and closed by the control logic 150 in order to connect and to disconnect a battery from the operational parts of product 140, such as, for example, an electric motor.

In another embodiment, control logic 150 may include a timer 151 that is set by the first control signal from integrated RFID tag 141. For instance, timer 151 may be set for 60 minutes and, in response, control logic 150 may set the second control signal to enable the controlled functionality 155. When timer 151 counts down to zero, control logic 150 may then set the second control signal to disable the controlled functionality 155 after 60 minutes of operation.

In another embodiment, product 140 may optionally include an internal location device 173 or may be coupled to an external location device 172. By way of example, location devices 172 and 173 may be GPS devices that provide location data to control logic 150 for geofencing applications. In such an embodiment, if control logic 150 determines that product 140 has moved outside of a defined boundary or more than a maximum threshold distance from a predetermined point, control logic 150 may set the second control signal to disable the controlled functionality 155.

In another embodiment, control logic 150 may optionally be coupled to a graphical user interface (GUI) 171 associated with product 140 or an external central control device 170. GUI 171 or central control device 170 may be configured, for example, to provision integrated RFID tag 141 or to enable and disable controlled functionality 155 through control logic 150. In an embodiment, central control device 170 may be wirelessly connected to user device 110 and/or control logic 150, such as be a WIFI connection or a cellular connection.

Figure 2A:
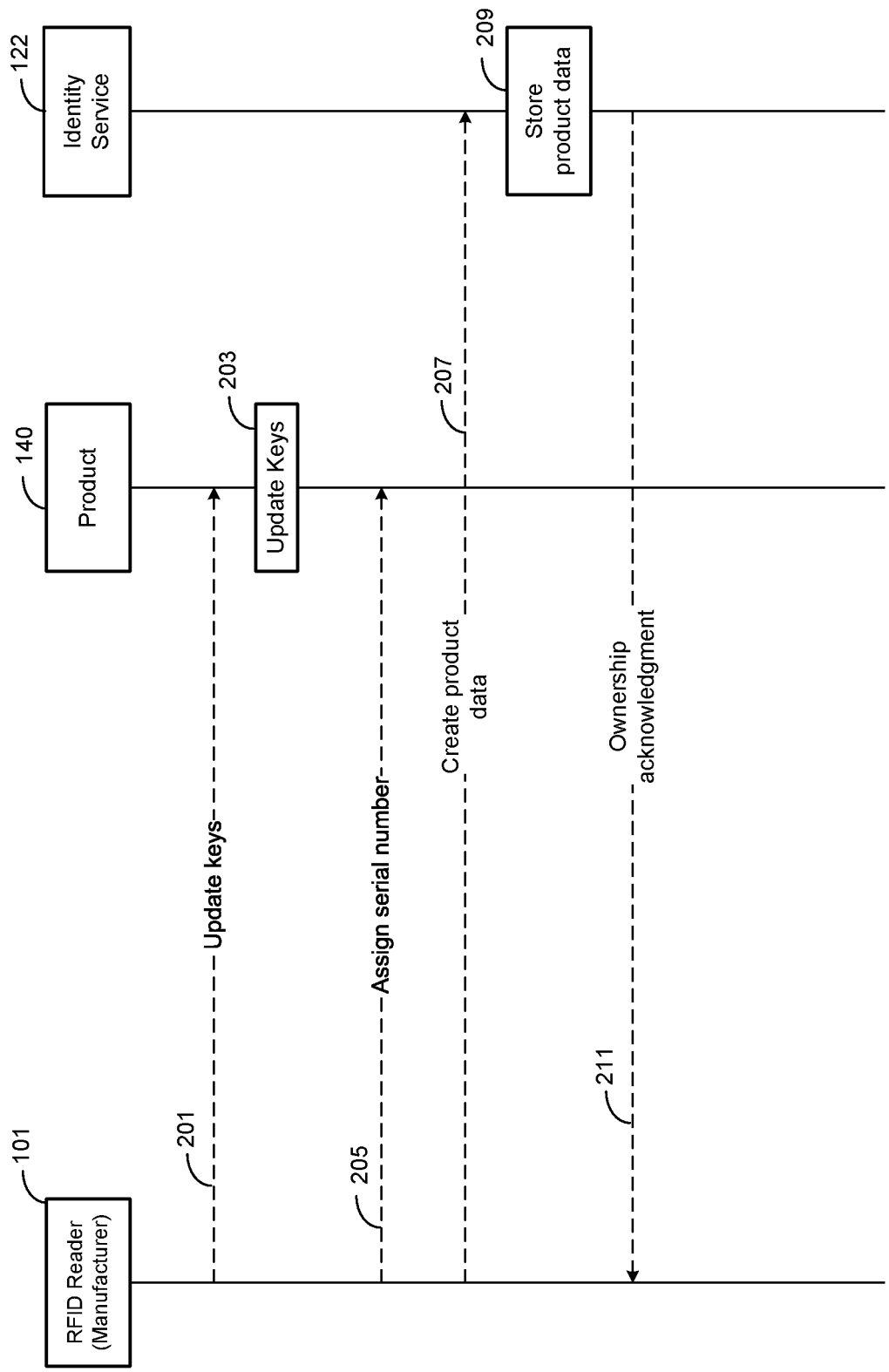
FIG. 2A is a flow diagram of a method of product creation according to an embodiment of the disclosure.

FIG. 2A is a flow diagram of a method of product creation according to an embodiment of the disclosure. It may be assumed initially that manufacturer 101 is registered with identity service 122. In step 201, the manufacturer 101 may use an RFID reader to transfer or update the keys in product 140. The key update may include, by way of example, a default master key, a new master key 142, an EPC 144, and a working key 143. In step 203, the received update keys are stored into integrated RFID tag 141. In an alternate embodiment, central control device 170 may transfer the key information into integrated RFID tag 141. After step 203, the integrated RFID tag 141 is programmed and active. In step 205, manufacturer 101 creates serial number 161 and assigns the serial number 161 to product 140.

In step 207, manufacturer 101 creates the product data in identity service 122. The product data may include master key 142, EPC 144, working key 143, serial number 161 and owner ID associated with product 140. Since product 140 is still in the possession of manufacturer 101, the owner ID will identify manufacturer 101 as the owner. In step 209, identity service 122 stores the product data in memory storage associated with identity service 122. In step 211, identity service 122 transmits an ownership acknowledgement message to manufacturer 101. After step 211, integrated RFID tag 141 is programmed and the manufacturer 101 is the owner of product 140.

Figure 2B:
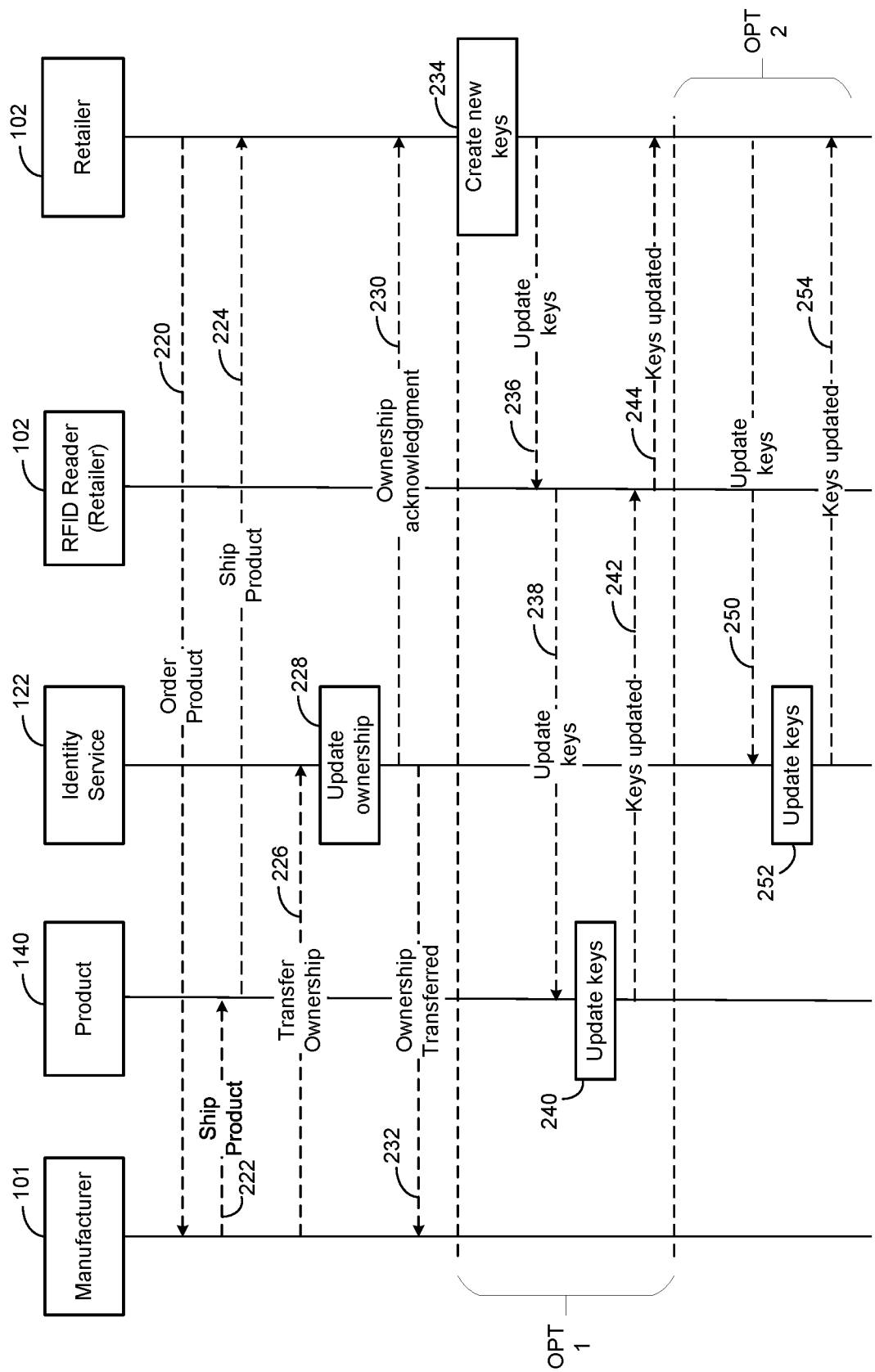
FIG. 2B is a flow diagram of a method of transferring of product ownership according to an embodiment of the disclosure.

FIG. 2B is a flow diagram of a method of transferring product ownership according to an embodiment of the disclosure. In FIG. 2B, it is assumed initially that manufacturer 101 owns product 140 and both manufacturer 101 and retailer 102 are registered with identity service 122. In 220, retailer 102 orders product 140 from manufacturer 101. The product order includes the owner ID associated with retailer 102. In response to the received product order, in step 222, manufacturer 101 orders that product 140 be shipped from its warehouse or other storage facility. In step 224, product 140 is shipped to retailer 102.

In step 226, manufacturer 101 initiates transfer of ownership to retailer 102 by transmitting to identity service 122 the current owner ID (i.e., ID of manufacturer 101), serial number 161, and the new owner ID (i.e., ID of retailer 102). In step 228, identity service 122 updates the ownership records of product 140 by storing the new owner ID of retailer 102 in the records for the product 140 associated with serial number 161. In step 230, identity service 122 transmits an ownership acknowledgement message to retailer confirming that retailer 102 owns product 140. The ownership acknowledgement message may include the owner ID of retailer 102, EPC 144, serial number 161, master key 142, and working key 143. In step 232, identity service 122 may also transmit to manufacturer 101 an ownership transferred message that includes the old owner ID (of manufacturer 101), the new owner ID (of retailer 102), and serial number 161.

After ownership is transferred in step 232, retailer 102 may optionally in step 234 create a new master key and a new working key associated with serial number 161. In step 236, the updated key information (i.e., EPC 144, master key 142, new master key 142, and working key 143) are transferred to an RFID reader operated by retailer 102. In step 238, the RFID reader of retailer 102 transfers the updated key information to product 140. In step 240, product 140 stores the received updated key information into integrated RFID tag 141. At this point, the new master key 142 and the new working key 143 are now embedded in integrated RFID tag 141. In step 242, the RFID tag 141 in product 140 transmits to the RFID reader of retailer 102 a key updated acknowledgement message which may include EPC 144. In step 244, the RFID reader of the retailer 102 transmits to the inventory system of retailer 102 a keys updated message which may include EPC 144. At this point, neither manufacturer 101 nor anyone else with the original keys can access product 140.

Next, retailer 102 may optionally use identity service 122 to backup the updated key information. In step 250, retailer 102 sends updated key information to identity service 122. The updated key information may include owner ID (of retailer 102), EPC 144, serial number 161, new master key 142 and new working key 143. In step 252, identity service 122 updates the key information in the records of retailer 102 for product 140. In step 254, identity service 122 transmits to retailer 102 a keys updated message that may include the updated master key 142 and the serial number 161.

FIG. 2C is a flow diagram of a method of provisioning working key RFID tag 115 according to an embodiment of the disclosure. Initially, it is assumed that customer owns product 140 and has an RFID tag to use as working key RFID tag 115. However, product 140 is still unusable since no working key has been provisioned to working key RFID tag 115. In step 260, customer 103 records EPC 116 of the RFID tag to use as working key RFID tag 115. In 261, customer 103 creates a working key 117. In step 262, customer 102 stores working key 117 in its records. In step 264, customer 103 sends updated working key information (e.g., EPC 116 and working key 117) to an RFID reader operated by customer 102. This may include, for example, RFID reader 111 in user device 110. The RFID reader 111 in step 266 sends the updated working key information to working key RFID tag 115. In response, working key RFID tag 115 in step 267 updates working key 117 and EPC 116. In step 268, working key RFID tag 115 transmits to RFID reader 111 a working key updated message that includes EPC 116. In step 269, RFID reader 111 transmits to customer 103 a working key updated message that includes EPC 116. After step 269, working key RFID tag 115 is ready to be used to enable and disable product 140.

In step 270, customer 103 uses user device 110 to send a message to RFID reader 111 to update working key 143 in product 140. The update product working key message may include EPC 144, master key 142, and working key 143. In step 272, RFID reader 111 sends the update product working key message to product 140. In step 274, product 140 updates the working key 143 in integrated RFID tag 141. In step 275, integrated RFID tag 141 transmits to RFID reader 111 a product working key updated message that may include EPC 144. In step 276, RFID reader 111 transmits to customer 103 a product working key updated message that may include EPC 144. At the completion of step 276, the working key 143 in the integrated RFID tag 141 matches the working key 117 in the working key RFID tag 115.

Figure 2D:
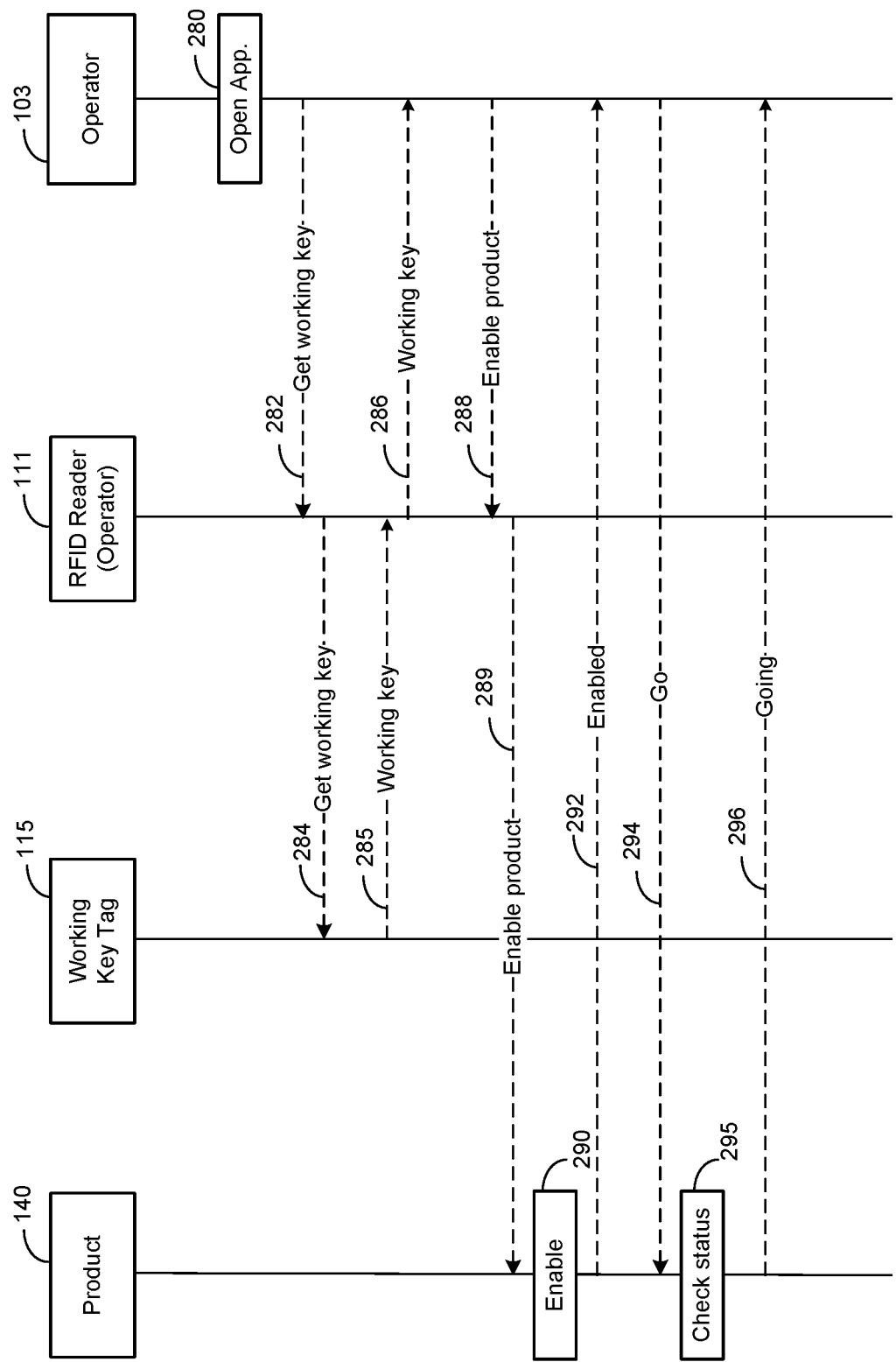
FIG. 2D is a flow diagram of a method of valid product use according to an embodiment of the disclosure.

FIG. 2D is a flow diagram of a method of valid product use according to an embodiment of the disclosure. Initially, it is assumed product 140 is provisioned to operate only in the presence of a working key tag 115 containing a valid working key 117. It is noted that in FIG. 2D, RFID reader 111 in user device 110 is capable of communicating with both working key tag 115 and integrated RFID tag 141 in product 140. This means that working key tag 115, product 140, and user device 110 must all be within a threshold distance of each other. The threshold distance may vary depending on the transmission range of the working key tag 115 and the integrated RFID tag 141. In a passive RFID embodiment, the threshold distance may be less than approximately 10-12 meters. In an active RFID embodiment, the threshold distance may be less than approximately 100 meters.

In step 280, the operator 103 of user device 110, which may be a mobile phone 110, opens an app in user device 110. In step 282, operator 103 uses user device 110 to send to RFID reader 111 a get working key message that may include EPC 116. In step 284, RFID reader 111 transmits to working key RFID tag 115 a get working key message that may include EPC 116. In response, in step 285, working key RFID tag 115 transmits to RFID reader 111 a working key message that may include EPC 116 and working key 117. In step 286, RFID reader 111 transmits the working key message to the app in user device 110 used by operator 103. After step 286, the app in user device 110 now has a copy of working key 117.

In step 288, operator 103 uses user device 110 to send to RFID reader 111 an enable product message that may include EPC 116 and working key 117. In step 289, RFID reader 111 transmits to product 140 an enable product message that may include EPC 116 and working key 117. In step 290, the integrated tag stores the working key 117 and sends a first control signal to control logic 150. In an embodiment, control logic 150 responds by comparing the stored working key 117 and the stored working key 143. Since the working key 117 matches the working key 143 control logic 150 generates a second control signal that enables product 140 for full operation. By way of example, control logic 150 may respond by generating a second control signal that closes a switch that applies power from a battery to the main electrical components of product 140.

In an alternate embodiment, after step 286, the user device 110 may compare the working key 117 received from working key tag 115 and the working key 143 embedded in integrated RFID tag 141 to determine if the working keys match. If the keys match, the user device 110 may transmit to product 140 via RFID reader 111 a password-protected enable signal. In an embodiment, the enable signal may be the working key 117. In response to the enable signal received from user device 110, control logic 150 may generate the second control signal that enables controlled functionality 155 to operate.

Optionally, in step 292, product 140 may transmit to the app in user device 110 an enable message indicating that product 140 is now enabled. Optionally, in step 294, the app in user device 110 may transmit a Go message to product 140. After step 284, product 140 is enabled and, if provisioned, timer 151 may be set to disable product 140 if the timer 151 is not refreshed by another first control signal from user device 110 and integrated RFID tag 141 before time 151 expires. In step 295, control logic 150 periodically checks the status of time 151 and, if timer has not expired, control logic 150 in step 296 may transmits a going message to the app in user device 110 to indicate product 140 is still enabled.

Figure 3A:
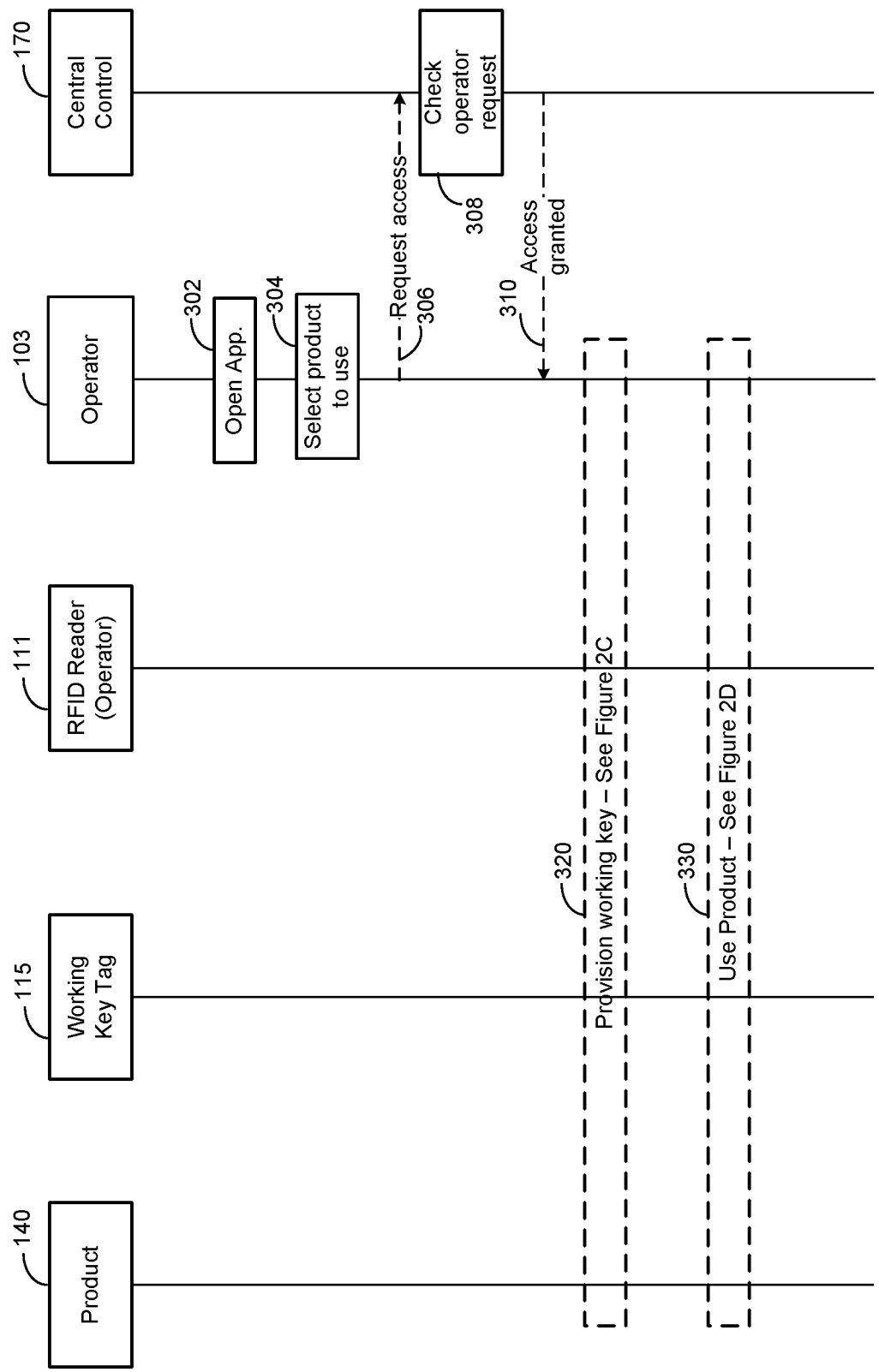
FIG. 3A is a flow diagram of a central control method of valid product use according to an embodiment of the disclosure.

FIG. 3A is a flow diagram of a central control method of valid product use according to an embodiment of the disclosure. Initially it is assumed that product 140 is provisioned to operate only in the presence of a working key RFID tag 115 with a valid working key 117. In step 302, operator 103 opens an app in user device 110, which may be a mobile phone 110. In step 304, the operator 103 selects a product 140 to use. In an embodiment, the product 140 may be selected based on serial number 161.

In step 306, operator 103 operates user device 110 to send a request access message to central control device 170. The request access message may include, for example, serial number 161, location data, time of day, and operator credentials. In response, in step 308, central control device 170 may check the operator request by verifying, for example, product 160, the location, the time of day, the operator credentials. If the operator access request is approved, in step 310, central control device 170 may transmit to operator 103 an access granted message that includes an EPC, a master key, and a working key. Thereafter, in step 320, operator 103 may provision a working key as described in FIG. 2C above. Then, in step 330, operator 103 may use product 140 as described in FIG. 2D above.

Figure 3B:
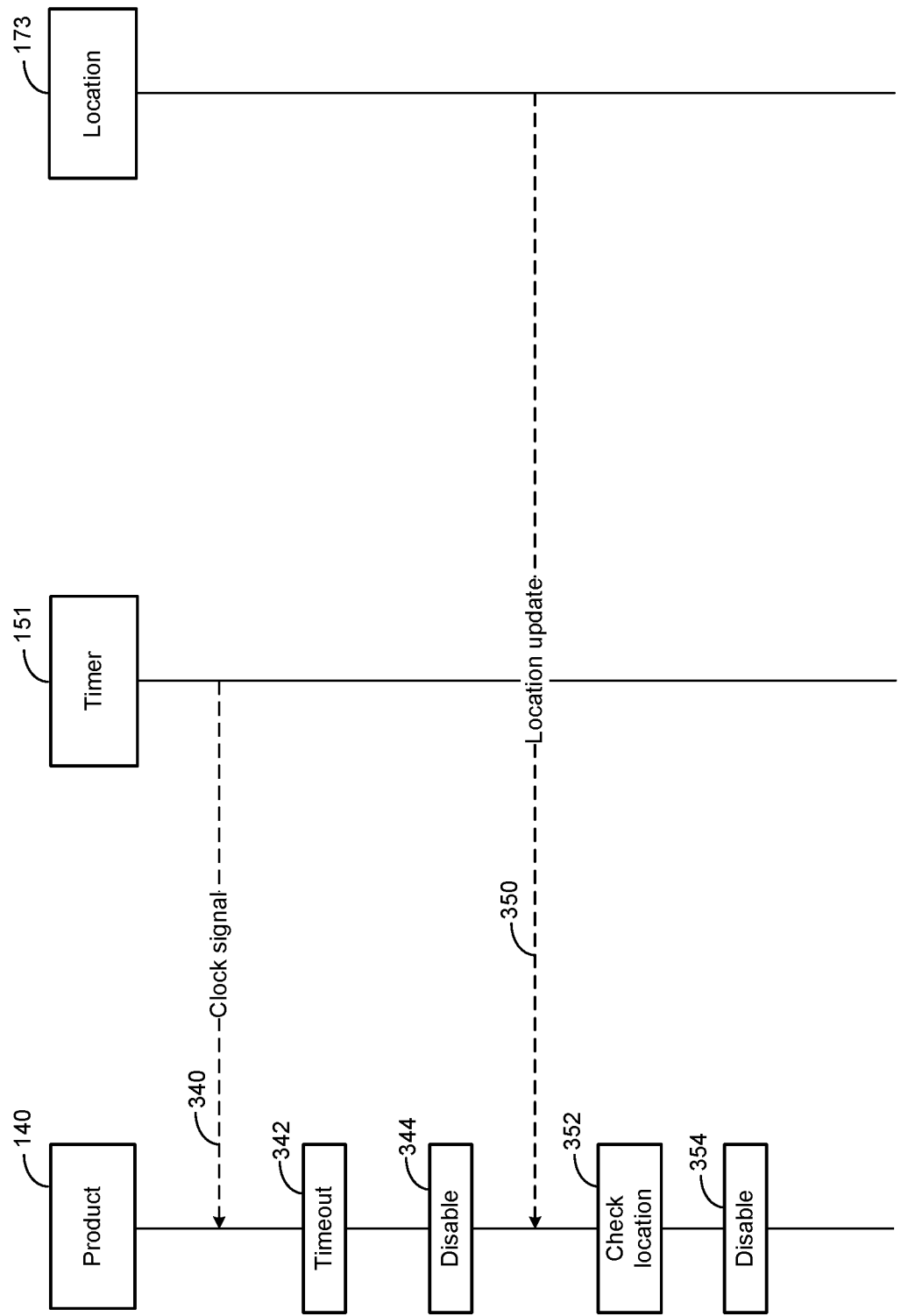
FIG. 3B is a flow diagram of a method of disabling a product according to an embodiment of the disclosure.

FIG. 3B is a flow diagram of a method of disabling a product 140 according to an embodiment of the disclosure. Initially, it is assumed that product 140 has been enabled and that timer 151 has been set to disable controlled functionality 155 after a selected time period. For example, the selected time period may be 60 minutes, 2 hours, 8 hours, or the like. In 340, control logic 150 in product 140 receives a clock signal and, in step 342, control logic 150 periodically checks that the clock signal has not expired. Timer 151 will not expire if the application running on operator's user device 110 uses RFID reader 111 to reset timer 151 at least once during the selected time period. For example, if the selected time period is 60 minutes, then the user device 110 must reset timer 151 at least once every 59 minutes, 59 seconds. If control logic 151 determines that timer 151 has expired to zero, in step 344, control logic 150 will set the second control signal to disable controlled functionality 155. The disable operation may be as simple as opening a switch that disconnects a battery (not shown) in product 140 from the operational electrical components of product 140. In some embodiments, timer 151 may comprise a clock that can be set to predetermined expiration time (or shutoff time) rather than using a countdown duration. For example, timer 151 may be set to a shutoff time of 5:00 PM. In such an embodiment, at 5:00 PM, timer 151 generates a shutoff signal that control logic 150 detects. In response, control logic 150 sets the second control signal to disable controlled functionality 155.

Alternatively, in a geofencing operation, product 140 may be disabled if product 140 moves out of a geofenced area. Assuming product 140 is initially enabled, in step 350, product 140 receives from time to time location data from location device 173 (or location device 172). In step 352, control logic 150 compares the location of product 140 to a geofenced area (e.g., a factory, a warehouse, a construction site, etc.) in which product 140 is authorized to operate. The allowed geofenced area may be stored in a memory associated with control logic 150. If product 140 is outside the allowed location, in step 354, control logic 150 will set the second control signal to disable controlled functionality 155.

The use of timer 151 and geofencing applications are useful in preventing employees from taking tools out of the workplace in order to work on side projects. Product 140 becomes useless outside of the geofenced area (e.g., a factory) and/or after workhours (e.g., after 5 PM). Preventing employees from taking tools for their own use extends the service life of the tools.

Figure 4:
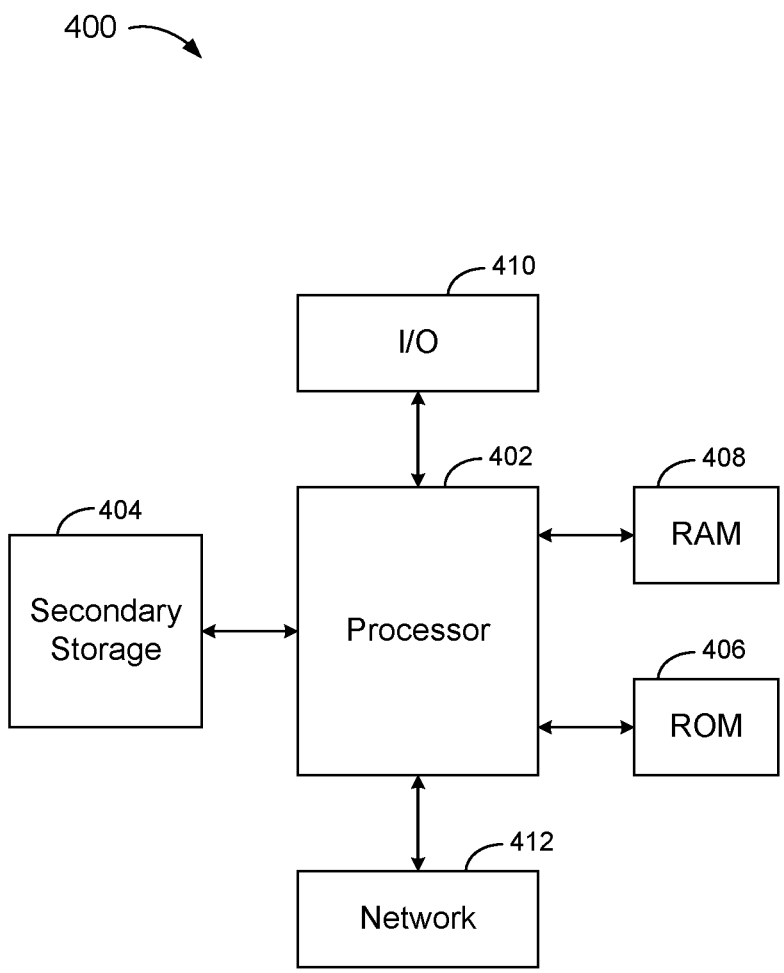
FIG. 4 is a block diagram of a device according to a second embodiment of the disclosure.

FIG. 4 is a block diagram of a user device 110 according to a second embodiment of the disclosure. In particular, FIG. 4 illustrates a computer system 400 that may be embodied in a mobile phone implementation of user device 110 for implementing one or more embodiments disclosed herein. The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips.

It is understood that by programming and/or loading executable instructions onto the computer system 400, at least one of the CPU 402, the RAM 408, and the ROM 406 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted, the CPU 402 may execute a computer program or application. For example, the CPU 402 may execute software or firmware stored in the ROM 406 or stored in the RAM 408. In some cases, on boot and/or when the application is initiated, the CPU 402 may copy the application or portions of the application from the secondary storage 404 to the RAM 408 or to memory space within the CPU 402 itself, and the CPU 402 may then execute instructions that the application is comprised of. In some cases, the CPU 402 may copy the application or portions of the application from memory accessed via the network connectivity devices 412 or via the I/O devices 410 to the RAM 408 or to memory space within the CPU 402, and the CPU 402 may then execute instructions that the application is comprised of. During execution, an application may load instructions into the CPU 402, for example load some of the instructions of the application into a cache of the CPU 402. In some contexts, an application that is executed may be said to configure the CPU 402 to do something, e.g., to configure the CPU 402 to perform the function or functions promoted by the subject application. When the CPU 402 is configured in this way by the application, the CPU 402 becomes a specific purpose computer or a specific purpose machine.

The secondary storage 404 is typically comprised of one or more disk drives or tape drives and is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 is typically faster than to secondary storage 404. The secondary storage 404, the RAM 408, and/or the ROM 406 may be referred to in some contexts as computer readable storage media and/or non-transitory computer readable media.

I/O devices 410 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. In particular, network connectivity devices 412 may include RFID reader 111 in user device 110. The network connectivity devices 412 may provide wired communication links and/or wireless communication links (e.g., a first network connectivity device 412 may provide a wired communication link and a second network connectivity device 412 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk-based systems may all be considered secondary storage 404), flash drive, ROM 406, RAM 408, or the network connectivity devices 412. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 404, to the ROM 406, to the RAM 408, and/or to other non-volatile memory and volatile memory of the computer system 400. The processor 402 may process the executable instructions and/or data structures in part by directly accessing the computer program product, for example by reading from a CD-ROM disk inserted into a disk drive peripheral of the computer system 400. Alternatively, the processor 402 may process the executable instructions and/or data structures by remotely accessing the computer program product, for example by downloading the executable instructions and/or data structures from a remote server through the network connectivity devices 412. The computer program product may comprise instructions that promote the loading and/or copying of data, data structures, files, and/or executable instructions to the secondary storage 404, to the ROM 406, to the RAM 408, and/or to other non-volatile memory and volatile memory of the computer system 400.

In some contexts, the secondary storage 404, the ROM 406, and the RAM 408 may be referred to as a non-transitory computer readable medium or a computer readable storage media. A dynamic RAM embodiment of the RAM 408, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

Advantageously, the duration of timer 150 may be programmable and could be set through RFID reader 111. RFID reader 111 may be provisioned to enable multiple devices with one user command (e.g., a tradesman could enable all of his tools at the beginning of the day). RFID reader 111 could be provisioned to support multiple users each with a second RFID tag. RFID reader 111 may be provisioned to enable a device(s) based on time of day or other calendar events. RFID reader 111 may be provisioned to refer to a central database to acquire tag identities and passwords (e.g., to support tool rental). RFID reader 111 may be provisioned to control device features (i.e., features and functions of the device could be controlled individually).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus configured to control operation of a product, the apparatus comprising:
   an integrated RFID tag embedded in the product and configured to communicate with an external user device, wherein the integrated RFID tag stores a first working key associated with the product and is further configured to receive a second working key transmitted from the external user device, wherein the external user device received the second working key from a working key tag, and wherein the first working key and the second working key are configurable encrypted values used to determine whether the integrated RFID tag and the working key tag are associated with each other; and
   control logic operatively coupled to the integrated RFID tag and configured to read the first working key and the second working key from the integrated RFID tag and to determine whether the first and second working keys match, wherein the control logic, in response to a determination that the first and second working keys match, enables a controlled functionality of the product.

2. The apparatus of claim 1, wherein the control logic is further configured to disable the controlled functionality in response to detection of a triggering event.

3. The apparatus of claim 2, wherein the control logic comprises a timer and the triggering event is an expiration of the timer.

4. The apparatus of claim 2, wherein the control logic is configured to receive location data indicating a location of the product and the triggering event is a determination by the control logic that the product is outside of a defined allowed location.

5. The apparatus of claim 4, wherein the control logic receives the location data from an external location device in communication with the product.

6. The apparatus of claim 4 wherein the product comprises an internal location device and the control logic receives the location data from the internal location device.

7. The apparatus of claim 1, wherein the control logic comprises a processor and a memory configured to store a control program executed by the processor and wherein the control logic disables the controlled functionality by setting a second control signal that disconnects power to the controlled functionality.

8. The apparatus of claim 1, wherein the control logic is further configured to disable the controlled functionality in response to detection of a triggering event.

9. The apparatus of claim 8, wherein the control logic comprises a timer and the triggering event is an expiration of the timer.

10. The apparatus of claim 8, wherein the control logic is configured to receive location data indicating a location of the product and the triggering event is a determination by the control logic that the product is outside of a defined allowed location.

11. A user device configured to control operation of a product, the user device comprising:
    an RFID reader configured to communicate with an integrated RFID tag embedded in the product and a working key RFID tag controlled by a user of the user device; and
    a processor operatively coupled to the RFID reader and configured to read a first working key stored in the working key RFID tag and to read a second working key stored in the integrated RFID tag, wherein the first working key and the second working key are configurable encrypted values used to determine whether the integrated RFID tag and the working key RFID tag are associated with each other, wherein the processor is further configured to:
    determine whether the first and second working keys match; and
    in response to a determination that the first and second working keys match, transmit an enable command to the product, wherein the enable command enables a controlled functionality of the product to operate.

12. The user device of claim 11, wherein the processor is further configured to read a first electronic product code in the working key RFID tag and to read a second electronic product code in the integrated RFID tag.

13. The user device of claim 12, wherein the processor is further configured to determine whether the first electronic code matches the second electronic product code and to transmit the enable command to the product only when the first electronic product code matches the second electronic product code.

14. A product comprising:
    a controlled functionality configured to be enabled by an enable command and to be disabled by a triggering event;
    an integrated RFID tag embedded in the product and configured to communicate with an external user device, wherein the integrated RFID tag stores a first working key associated with the product and is further configured to receive a second working key transmitted from the external user device, wherein the external user device received the second working key from a working key tag, and wherein the first working key and the second working key are configurable encrypted values used to determine whether the integrated RFID tag and the working key tag are associated with each other; and
    control logic operatively coupled to the integrated RFID tag and configured to read the first working key and the second working key from the integrated RFID tag and to determine whether the first and second working keys match, wherein the control logic, in response to a determination that the first and second working keys match, is further configured to transmit the enable command to the controlled functionality of the product.

15. The product of claim 14, wherein the control logic is further configured to disable the controlled functionality in response to detection of the triggering event.

16. The product of claim 15, wherein the control logic comprises a timer and the triggering event is an expiration of the timer detected by the control logic.

17. The product of claim 15, wherein the control logic is configured to receive location data indicating a location of the product and the triggering event is a determination by the control logic that the product is outside of a defined allowed location.

18. The product of claim 17, wherein the control logic receives the location data from an external location device in communication with the product.

19. The product of claim 17, wherein the product comprises an internal location device and the control logic receives the location data from the internal location device.

20. The product of claim 15, wherein the control logic comprises a processor and a memory configured to store a control program executed by the processor and wherein the control logic disables the controlled functionality by setting a control signal that disconnects power to the controlled functionality.

* * * * *